Patented June 8, 1954

2,680,767

UNITED STATES PATENT OFFICE 2,680,767

PANTOTHENYLAMINOETHYL SULFUR COMPOUNDS AND METHOD FOR OBTAINING THE SAME

Esmond E. Snell, Madison, Wis., and Eugene L. Wittle and James A. Moore, Detroit, Mich., assignors to Parke, Davis & Company, Detroit, Mich., a corporation of Michigan No Drawing. Application October 24, 1950, Serial No. 191,936

7 Claims. (Cl. 260—561)

This invention relates to organic sulfur compounds and to methods for obtaining the same. More particularly, the invention relates to organic sulfides having the formula,

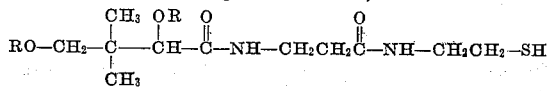

and the corresponding organic disulfides having the formula,

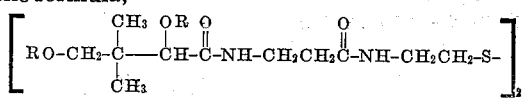

and to methods for preparing these products; where R is hydrogen, benzoyl or a lower fatty acid acyl radical. The invention is further concerned with the specific organic sulfide (Y—S)H and the corresponding organic disulfide (Y—S—)$_2$ in which Y denotes a radical of formula,

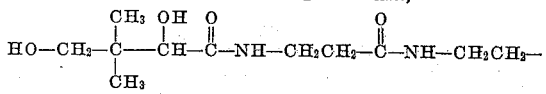

In accordance with the invention several methods are provided for obtaining the products having the above formulae. The sulfide and disulfide wherein R is hydrogen can be prepared by reacting an ester of pantothenic acid or of acylated pantothenic acid with β-mercaptoethylamine and bis(β-aminoethyl) disulfide, respectively. In carrying out the reaction the reactants are heated together with or without a solvent. The solvent for the reaction can be water or organic solvents such as lower aliphatic alcohols, lower aliphatic ethers, dioxane, toluene, xylene, pentane and the like. In some instances, such as when phenyl esters are employed, it is advantageous to use a catalyst such as ammonium chloride, acetamide, an alkali metal hydroxide, an alkali metal alcoholate and the like to accelerate the rate of reaction. When an ester of acylated pantothenic acid is used as the starting material, sufficient β-mercaptoethylamine or bis(β-aminoethyl) disulfide must be used to react with all of the ester groups present in the starting material. For example, at least three equivalents of β-mercaptoethylamine should be used when using an ester of diacetoxy pantothenic acid as the starting material. In the other instances, that is, when an ester of pantothenic acid is used as the starting material, one equivalent of β-mercaptoethylamine and one-half equivalent of bis(β-aminoethyl) disulfide suffices but more, of course, can be used if desired. This process can be diagrammatically represented as follows:

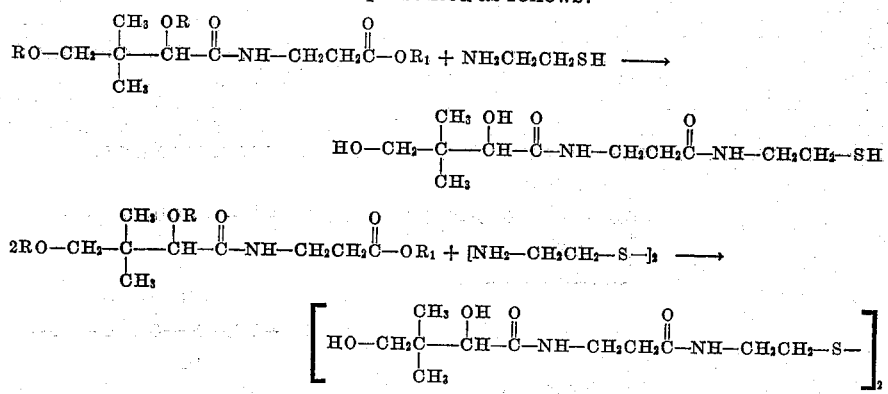

where R$_1$ is a lower alkyl, a lower phenalkyl or phenyl radical and R has the same significance as given above.

The products of the invention can also be prepared by heating pantothenic acid or a di-O-ester thereof with β-mercaptoethylamine or bis-(β-aminoethyl) sulfide. The reaction can be carried out at a temperature between 60 and 200° C. and in the presence or absence of a solvent. As solvents, alcohols, high boiling ethers, benzene, xylene, toluene and the like can be used. This process can be diagrammatically depicted as follows:

The reaction mixture need not be heated for long periods of time nor at very high temperatures in order to bring about the conversion. If desired, a tertiary amine such as pyridine and the like can be used as a catalyst to accelerate the reaction. The acylated products so obtained can

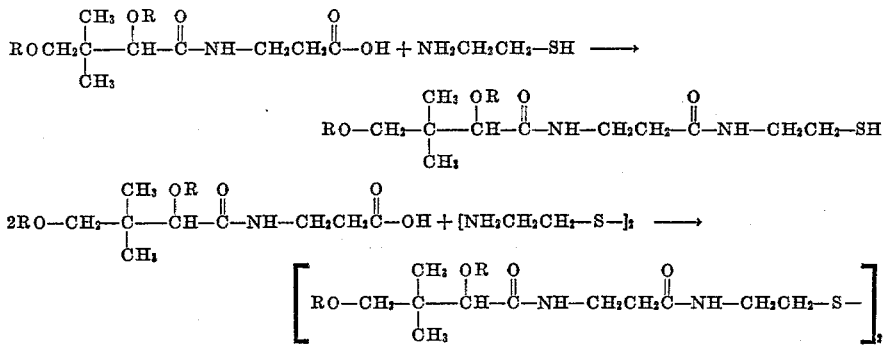

where R has the same significance as given above. If desired, the acylated products, that is, those where R is a benzoyl or fatty acid acyl radical, be converted, if desired, to the free hydroxy compounds by mild hydrolysis. The transformations described about can be illustrated as follows:

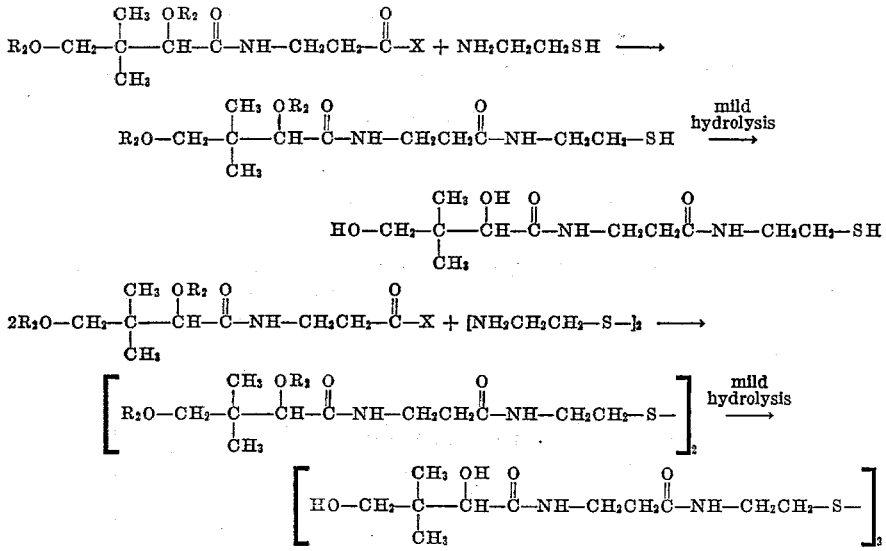

can be converted to the corresponding free hydroxy compounds by mild hydrolysis, for example, with 0.1 to 1 N aqueous alkali at room temperature.

Another method which can be used to prepare the products of the invention involves reacting a di-O-acylated acid halide of pantothenic acid with β-mercaptoethylamine or bis(β-aminoethyl)disulfide. The reaction is usually carried out in the presence of an inert solvent such as benzene, xylene, dioxane, pentane or the like.

where X is a halogen atom and $R_2$ is a benzoyl or lower fatty acid acyl radical.

Still another method by which the hydroxylic products of the invention can be prepared involves condensing pantolactone with the β-thioethyl amide of β-alanine or the corresponding disulfide. The condensation can be carried out in the presence or absence of a solvent such as water, lower aliphatic alcohols, benzene and the like. This process can be diagrammatically represented as follows:

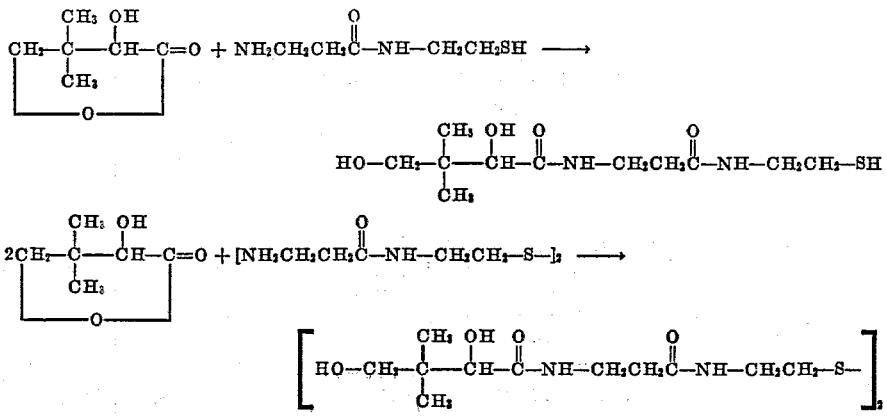

The β-thioethyl amide of β-alanine and the corresponding disulfide used as starting materials in the above described process can be prepared in several ways. For instance, they may be prepared by condensing ethyl carbobenzoxy-β-alanate or carbobenzoxy-β-alanyl chloride with β-mercaptoethylamine or bis(β-aminoethyl) disulfide and treating the reaction product with phosphonium iodide to split off the carbobenzoxy group. These starting materials can also be prepared by treating N-(N-carbobenzoxy-β-alanyl)-2-aminoethanol with phosphorus pentasulfide and then splitting off the carbobenzoxy group by treatment with phosphonium iodide. The β-thioethyl amide of β-alanine so obtained can be converted to the disulfide by oxidation with air, hydrogen peroxide or iodine. Alternatively, the mercaptan can be oxidized before the carbobenzoxy group is split off.

A further method of preparing the diacylated sulfide compounds of the invention comprises reacting diacylated N-(pantothenyl)-β-aminoethanol with phosphorus pentasulfide. This conversion can be represented as follows:

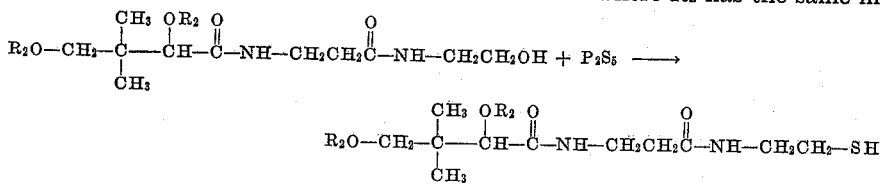

where R₂ has the same significance as given above. The diacylated N-(pantothenyl)-β-aminoethanol used as the starting material in this process can be prepared by reacting diacylated pantothenyl chloride with β-aminoethanol. It can also be prepared by condensing diacylated pantoyl chloride with N-(β-alanyl)-β-aminoethanol or by heating diacylated pantothenic acid with ethanolamine.

A still further method for preparing the products of the invention involves reacting an N-(pantothenyl)-β-aminoethyl halide or a diacylated derivative thereof with an inorganic disulfide or inorganic hydrogen sulfide. The use of inorganic hydrogen sulfides such as the alkali metal hydrogen sulfides leads to the production of the sulfide compounds of the invention, while the use of inorganic disulfides such as the alkali metal or alkaline earth metal disulfides leads to the production of the disulfide products of the invention. This process can be depicted as follows:

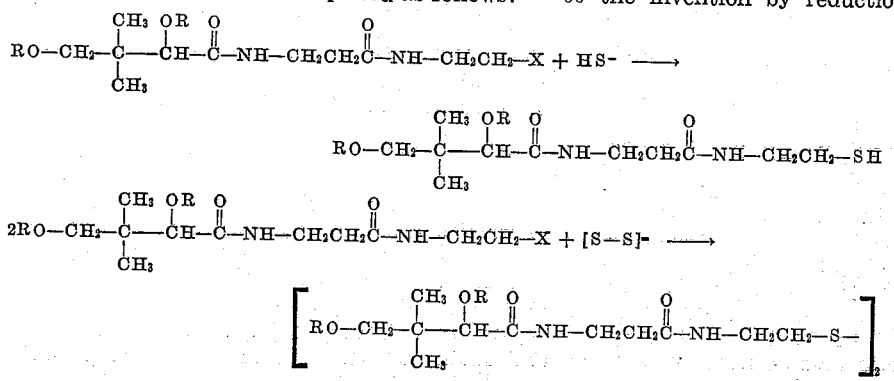

where X is a halogen atom and R has the same significance as given above.

The N-(pantothenyl)-β-aminoethyl halides and their diacylated derivatives used as starting materials in the above described process can be prepared by condensing a pantothenate ester or diacylated derivative thereof with a β-aminoethyl halide or by reacting a diacylated N-(pantothenyl)-β-aminoethanol with a thionyl halide or phorphorous pentachloride.

Another method for preparing the sulfide products of the invention comprises condensing ethylene sulfide with pantothenyl amide or a diacylated derivative thereof. This method may be diagrammatically illustrated as follows:

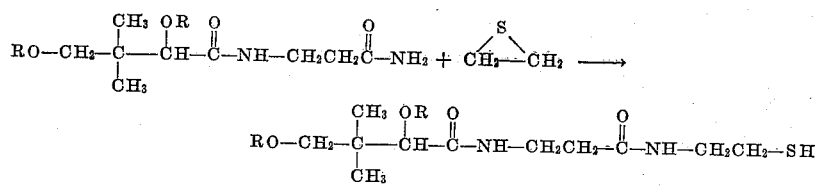

where R has the same significance as given above.

The sulfide products of the invention can also be prepared by converting the sulfonic acid of formula,

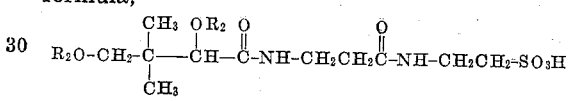

where R₂ has the same meaning as given above; to the sulfonyl chloride by treatment with thionyl chloride or phosphorus pentachloride and reducing the sulfonyl chloride to the desired sulfide compound. The sulfonic acid used as a starting material can be prepared by treating an ester of pantothenic acid with an alkali metal taurate and esterifying the two hydroxyl groups of the product. It can also be prepared by condensing the peptide,

NH₂CH₂CH₂CONHCH₂CH₂SO₃M, where M is an alkali metal, with pantolactone followed by acylation of the two hydroxyl groups of the product.

The sulfide products of the invention can be converted to the disulfide products by oxidizing the former with air, iodine or hydogen peroxide. Similarly, the disulfide products of the invention can be converted to the sulfide products of the invention by reduction with inorganic cyanides, thioglycollic acid, an alkali metal in liquid ammonia and tin in a mineral acid.

From the foregoing it will be apparent to those skilled in the art that the products of the invention as well as the starting materials used in their production exist in optical isomeric form. By utilizing the optically active isomers of the starting materials the optically active isomers of the products of the invention are obtained. In the processes employing pantolactone the (—) isomer is employed when the (+) rotatory optical isomer of the final product is desired. In the other cases the (+) rotatory isomer of the starting material is used when the (+) rotatory optical isomer of the final product is desired. In the foregoing description and in the claims where no optical designation is given the chemical names and formulae are to be interpreted in their generic sense, that is, as including the individual optical isomers as well as the racemic mixture thereof.

The products of the invention are of pharmaceutical value. The products containing free hydroxyl groups are growth factors for a number of microorganisms, notably, *Lactobacillus bulgaricus*, *Lactobacillus helveticus* and other lactic acid bacteria, and also appear to be essential portions of the coenzyme A molecule.

The invention is illustrated by the following examples.

Example 1

(a) A solution consisting of 6.5 g. of ethyl d-pantothenate and 2 g. of β-mercaptoethylamine in 5 cc. of dry isopropanol is heated under reflux on a steam bath for two hours. The reaction mixture is evaporated to dryness in vacuo at room temperature. The last traces of solvent are removed at 100° C. in vacuo to obtain 6.8 g. of a clear, colorless, viscous oil.

The crude N-[(+) pantothenyl]-β-aminoethanethiol so obtained is purified by dissolving the crude reaction product in 45 cc. of anhydrous n-butanol and pouring the resulting solution through a chromatograph column containing 272 g. of activated carbon. The column is washed with n-butanol and fractions are collected from time to time and the fractions containing solids assaying about 25 to 40% pure N - [(+) pantothenyl] - β - aminoethanethiol against *Lactobacillus helveticus* 80 poured onto a chromatograph column containing 136 g. of magnesium silicate (Superfiltrol). The column is washed thoroughly with anhydrous n-butanol and the washings and main solution discarded. n-Butanol saturated with water is poured through the column to elute the N-[(+) pantothenyl]-β-aminoethanethiol and the resulting solution evaporated to dryness in vacuo at low temperature to obtain the desired product in pure form. Its formula is:

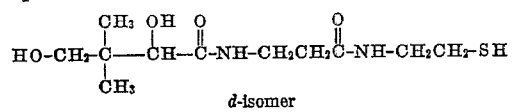

d-isomer

Instead of pouring the anhydrous n-butanol solution onto the magnesium silicate chromatograph column, one can simply repeat the treatment with a carbon chromatograph column to obtain the pure product. In some instances, the first carbon treatment produces fractions containing pure N-[(+) pantothenyl]-β-aminoethanethiol and in those cases it is, of course, not necessary to treat the fraction with magnesium silicate nor again with activated carbon.

(b) A solution of 2.2 g. of ethyl d-pantothenate and 700 mg. of β-mercaptoethylamine in 5 cc. of absolute ethanol and 10 cc. of dry isopropanol is heated under reflux for four and one-half hours. The reaction mixture is evaporated to dryness in vacuo at 100° C. for one-half hour to obtain 2.3 g. of clear, colorless oil consisting of crude N-[(+) pantothenyl]-β-aminoethanethiol. The pure product can be isolated from this oil by the method described in (a).

(c) A crystal of acetamide is added to a solution consisting of 2 g. of methyl d-pantothenate and 650 mg. of β-mercaptoethylamine in 10 cc. of dry methanol and the resulting mixture heated under reflux for eighteen hours. The reaction mixture is evaporated to dryness in vacuo to obtain 2.2 g. of a clear, colorless oil containing by microbiological assay against *Lactobacillus helveticus* 80 10% pure N-[(+) pantothenyl]-β-aminoethanethiol. The pure product can be isolated from the oil by the method described in (a).

(d) A solution consisting of 2 g. of methyl d-pantothenate, 600 mg. of β-mercaptoethylamine and a crystal of acetamide in 3 cc. of water is heated on a steam bath for one and one-half hours. The reaction mixture is evaporated to dryness in vacuo to obtain 2.4 g. of a clear colorless oil assaying against *Lactobacillus helveticus* 80 about 12% pure N-[(+) pantothenyl]-β-aminoethanethiol. The pure product can be isolated from the oil by the method described in (a) above.

(e) A solution of 0.005 g. of sodium in absolute ethanol is added to a solution of 0.6 g. of ethyl d-pantothenate and 0.2 g. of β-mercaptoethylamine in absolute ethanol. The reaction mixture is heated under reflux for two and one-half hours on a steam bath and then evaporated to dryness in vacuo to obtain 0.5 g. of an orange oil consisting of crude N-[(+) pantothenyl]-β-aminoethanethiol. The pure product can be isolated from this oil by the method described in (a) above.

(f) A solution consisting of 349.5 g. of methyl d-pantothenate, 115 g. of β-mercaptoethylamine and 150 mg. of acetamide in two liters of methanol is heated under reflux for eleven hours. The mixture is evaporated to dryness in vacuo at 70° C. to obtain 408 g. of a clear, viscous oil containing about 10% N-[(+) pantothenyl]-β-aminoethanethiol.

The viscous oil prepared above is dissolved in methanol and the solution made 1 N by the addition of strong potassium hydroxide solution. The mixture is allowed to stand for one hour at room temperature to hydrolyze any unreacted methyl d-pantothenate. The alkaline solution is neutralized to pH 6 with dilute hydrochloric acid and extracted with n-butanol. The n-butanol extracts are evaporated to dryness in vacuo to obtain a clear, viscous oil which is about 60% pure N-[(+) pantothenyl]-β-aminoethanethiol. The crude product is redissolved in n-butanol and the solution poured through a chromatograph column containing about 1600 g. of activated carbon. The fractions containing the highest concentration of N-[(+) pantothenyl]-β-aminoethanethiol as determined by microbiological assay against *Lactobacillus helveticus* 80 are poured onto a chromatograph column containing 800 g. of magnesium silicate (superfiltrol). The column is washed thoroughly with anhydrous n-butanol and the washings and main solution discarded. n-Butanol saturated with water is poured through the column to elute the N-[(+)pantothenyl]-β-aminoethanethiol and the resulting solution evaporated to dryness in vacuo at low temperature. The pure product so obtained is a clear, viscous oil.

In some instances the n-butanol fractions obtained from the activated carbon chromatograph column contain the desired product in pure form. In these cases the n-butanol is simply evaporated in vacuo to obtain the pure product and the fraction not treated with magnesium silicate.

(g) 0.385 g. of β-mercaptoethylamine is added to a solution of 1.1 g. of d-pantothenic acid in 10 cc. of absolute ethanol. The solution is warmed on a steam bath and the ethanol allowed to evaporate. The clear oil which remains weighs 1.81 g. The oil is heated in an oil bath at 120° C. for two hours under a pressure of 0.3 mm. of mercury. The clear oil thus obtained consists of crude N-[(+)pantothenyl]-β-aminoethanethiol. The pure product can be isolated from this oil by the method described in (a) above.

*Example 2*

(a) A solution consisting of 1.7 g. of methyl d-pantothenate, 520 mg. of bis(β-aminoethyl)-disulfide and a crystal of acetamide in 4 cc. of water is heated on a steam bath for two hours. The solution is evaporated to dryness in vacuo at 100° C. for one-half hour. The 2.3 g. of thick orange liquid thus obtained consists of crude bis[N(+) - pantothenyl - β - aminoethyl]disulfide.

The pure product is obtained by dissolving the crude reaction product in 15 cc. of anhydrous n-butanol and pouring the resulting solution through chromatograph column containing 184 g. of activated carbon. The column is washed with n-butanol and fractions are collected from time to time and the fractions containing solids assaying about 25–40% pure bis[N(+)-pantothenyl-β-aminoethyl]disulfide against *Lactobacillus helveticus* 80 poured onto a chromatograph column containing 46 g. of magnesium silicate (superfiltrol). The column is washed thoroughly with anhydrous n-butanol and the washings and main solution discarded. n-Butanol saturated with water is poured through the column to elute the bis[N(+)-pantothenyl-β-aminoethyl]-disulfide and the resulting solution evaporated to dryness in vacuo at a low temperature to obtain the desired product in pure form. Its formula is,

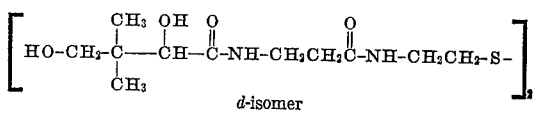

(b) A solution consisting of 2.4 g. of ethyl d-pantothenate and 740 mg. of bis[β-aminoethyl]-disulfide in 2 cc. of dry isopropyl alcohol is heated on a steam bath for two and one-half hours. The solution is evaporated to dryness in vacuo at 100° C. to obtain 3.1 g. of a clear, viscous oil consisting of crude bis[N(+)-pantothenyl-β-aminoethyl]disulfide. The pure product can be isolated from this oil by the method described in (a) above.

(c) A solution consisting of 1.2 g. of bis(β-aminoethyl)disulfide and 3.54 g. of d-pantothenic acid in 30 cc. of ethanol is evaporated to dryness under a stream of oxygen. The residue is placed under a vacuum and heated in an oil bath at 80–150° C. for one hour at 0.8 mm. pressure of mercury. The remaining oil, 4.3 g., consists of crude bis[N(+)-pantothenyl-β-aminoethyl]disulfide. The pure product can be isolated from this orange-colored oil by the method described in (a) above.

(d) 2.25 g. of bis(β-aminoethyl)disulfide dihydrochloride is added to a solution of 0.46 g. of sodium in 100 cc. of dry methanol. 4.66 g. of methyl d-pantothenate is added to the reaction mixture and the solution refluxed for eleven hours. The reaction mixture is concentrated until the precipitation of sodium chloride is complete, the precipitate removed by filtration and the residue evaporated to dryness in vacuo. The orange oil thus obtained (5.3 g.) consists of crude [N(+)-pantothenyl-β-aminoethyl]disulfide. The pure product can be isolated from this oil by the method described in (a) above.

*Example 3*

(a) A solution consisting of 175 g. of methyl dl-pantothenate, 57.5 g. of β-mercaptoethylamine and 100 mg. of acetamide in one liter of methanol is heated under reflux for twelve hours. The reaction mixture is evaporated to dryness in vacuo to obtain about 200 g. of a clear, viscous oil consisting of crude N-[(dl)-pantothenyl]-β-aminoethanethiol. The oil is dissolved in methanol, the solution made 1 N in potassium hydroxide by the addition of strong potassium hydroxide solution and the alkaline solution allowed to stand at room temperature for one hour. The solution is made acid to pH 6 by the addition of hydrochloric acid and extracted with n-butanol. The combined n-butanol extracts are dried, poured through a chromatograph column containing 800 g. of activated carbon and fractions collected from time to time. The fractions having the highest assay value against *Lactobacillus helveticus* 80 are poured onto a chromatograph column containing 400 g. of magnesium silicate (Superfiltrol) and the column washed well with anhydrous n-butanol. The main solution and washings are discarded and the column washed well with n-butanol saturated with water. The aqueous solution is evaporated to dryness in vacuo to obtain the desired N-[(dl)-pantothenyl]-β-aminoethanethiol as a clear, colorless oil. The formula of this product is,

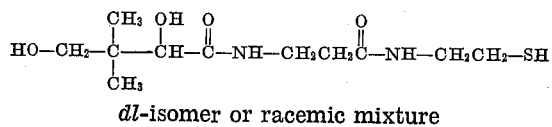

dl-isomer or racemic mixture (b) A solution consisting of 19.5 g. o f ethyl dl-pantothenate and 6 g. of β-mercaptoethylamine in 15 cc. of dry isopropanol is heated under reflux on a steam bath for four hours. The reaction mixture is evaporated to dryness in vacuo to obtain a clear, colorless, viscous oil consisting of crude N-[(dl)-pantothenyl]-β-aminoethanethiol. The crude product thus obtained can be purified by the method set forth in (a) above.

What we claim is:
1. N-[(+)-pantothenyl]-β-aminoethanethiol.
2. N-[(dl)-pantothenyl]-β-aminoethanethiol.
3. Bis[N(+) - pantothenyl - β - aminoethyl]-disulfide.

4. An organic sulfur compound of the class consisting of a sulfide (Y—S—)H and a disulfide (Y—S—)$_2$ where Y is a radical of formula,

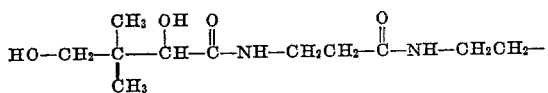

5. Process for obtaining a sulfur compound of the class consisting of a sulfide (Y—S—)H and a disulfide (Y—S—)$_2$, where Y is a radical of formula,

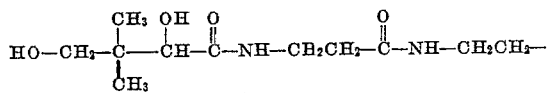

which comprises heating an ester of formula,

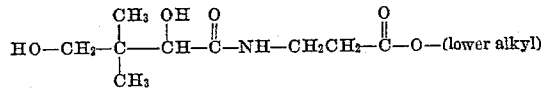

with a compound of the class consisting of β-mercaptoethylamine and bis-(β-aminoethyl) disulfide.

6. Process for obtaining a sulfide of formula,

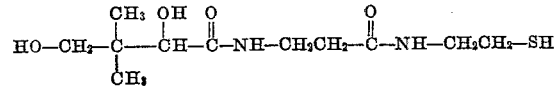

which comprises heating an ester of formula,

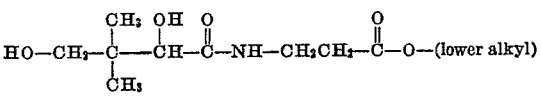

with β-mercaptoethylamine.

7. Process for obtaining a sulfide of formula,

which comprises heating an ester of formula,

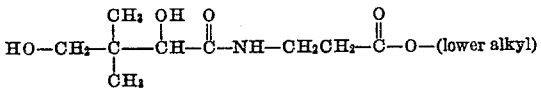

with bis (β-aminoethyl) disulfide.

References Cited in the file of this patent

Williams et al.: "J. Biol. Chem.," vol. 177 (1949), pp. 933-40.

Snell et al.: "J. Am. Chem. Soc.," vol. 72, Nov. 1950, pp 5349, 5350.

Barnett: "J. Chem. Soc.," 1944, pp. 5 to 8.